Nov. 22, 1932.  B. S. HOGELAND  1,888,226
TEAT CUP
Filed June 7, 1929
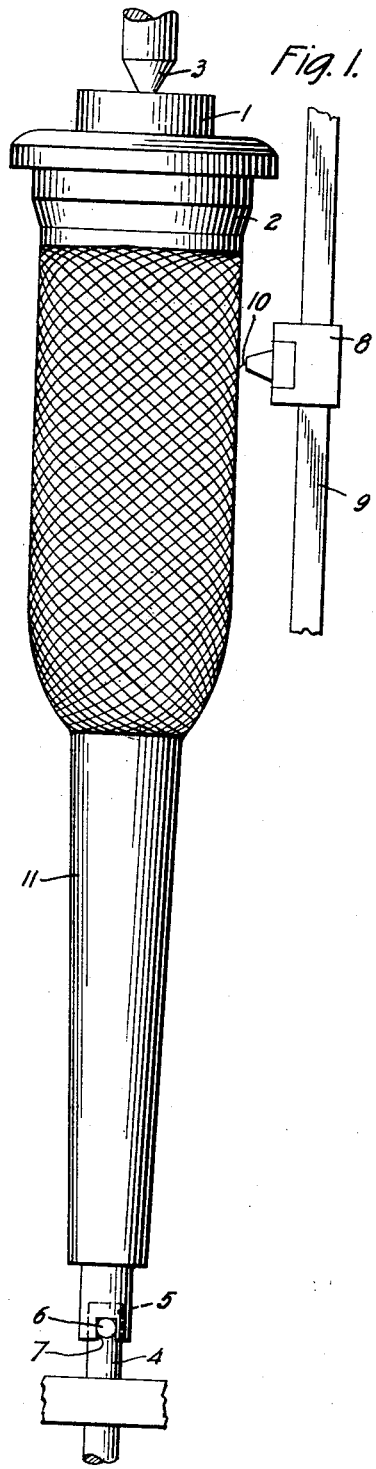
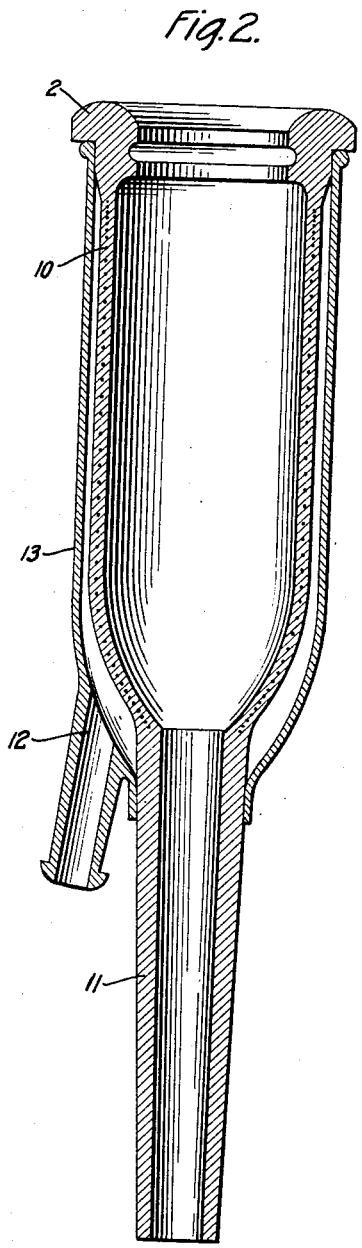
INVENTOR
Bessie S. Hogeland.
BY
Moses & Nolte
ATTORNEYS Patented Nov. 22, 1932

1,888,226

UNITED STATES PATENT OFFICE

BESSIE S. HOGELAND, OF GLEN RIDGE, NEW JERSEY

TEAT CUP

Application filed June 7, 1929. Serial No. 369,027.

This invention relates to milking machines and more particularly to teat cup inflations therefor.

In double chambered teat cups as widely employed in milking machines, provision is made of a rigid metallic shell which is placed in communication alternately with a source of suction and with the atmosphere. An elastic inflation, generally of rubber, is received in the shell and divides the shell into inner and outer chambers. The inner chamber is adapted to receive the cow's teat and is in communication with a steady source of suction. The inflation is caused to squeeze the teat when atmospheric pressure occurs in the outer chamber of the teat cup and to expand to permit the milk to flow when suction occurs in the outer chamber of the teat cup. The fault of teat cup inflations, which are not reinforced and which are now commonly used, is that they are necessarily made in a form which is not well adapted to the purpose or else have walls too thick to collapse as flexibly upon the teat as desirable and are short lived. It is desirable that the teat cup inflation have a thin and flexible wall so that it responds readily to variations of pressure and conforms pliably to the teat.

Cloth or woven fabric is now used to reinforce teat cup inflations with some degree of success. This cloth reinforcement is fabricated separately and inserted in the inflation afterwards. In the separately woven reinforcement of present practice the threads are so interlocked that the fabric does not readily accommodate itself to the flexure and particularly to extension of the inflation beyond its normal diameter.

In order to provide for the necessary free flow of the air between the teat cup shell and the inflation wall it is practice to make the outside diameter of the inflation wall considerably less than the inside diameter of the teat cup shell and while the inflation expands from collapse to its normal diameter by its own inherent resilience, in order to release the teat completely from pressure, it is desirable to apply greater suction on the outside of the inflation than on the inside and thus expand it beyond its normal diameter.

The cloth reinforcement of practice resists expansion beyond its fabricated diameter and thus interferes with the desired complete release of the teat and is also subjected to stress which is injurious to the fabric. This interference with the all important freedom of flexure and expansion also lessens the squeeze and release of the inflation and to this extent detracts from the successful functioning of the milker.

The teat cup reinforcement fabricated, as herein set forth, by laying each separate thread spirally in its normal position in the wall of the inflation allows each thread individually to accommodate itself to the flexure and expansion of the inflation without restraint from other threads of the reinforcement and thus contributes greatly to the pliability and to the life of the inflation.

It is a further object of the invention to apply the reinforcement in such manner that it will be most effective to resist stretching in that portion of the inflation which lies adjacent the suction port of the teat cup shell. This is important for the reason that inflations heretofore employed have shown a tendency both to become elongated and enlarged in diameter with the result that the inflation body eventually covers the suction port and thereby renders the teat cup inefficient or even wholly inoperative.

Another object of the invention is to provide a reinforcement which is strong to resist collapse of the inflation and prevent leakage where it joins the teat cup shell at its upper and lower ends and which, at the same time, has the desired flexibility in its intermediate collapsible portion.

A further object of the invention is to provide a simple, rapid, efficient and economical method of providing the teat cup inflation with a reinforcement having the desirable characteristics above referred to.

Other objects and advantages will hereinafter appear.

In the drawing forming a part of this specification, Figure 1 is a fragmentary elevation showing how the reinforcement is applied to the teat cup inflation, and Figure 2 is a sectional elevation of the completed inflation assembled with the outer shell member of a teat cup.

As illustrated in Figure 1, a mandrel 1 shaped to fit the interior of a teat cup inflation and having a piece of rubber stock 2 previously molded to the shape of a teat cup inflation placed thereon, is chucked in a lathe between a bearing 3 and a driving spindle 4. The driving spindle is adapted to fit in a recess 5 in the lower end of the mandrel 1 and is provided with a cross pin 6 which engages in a slot 7 that extends diametrically across the lower face of the mandrel. The spindle 4 is adapted to be driven either manually or by power means and is preferably driven at a uniform rate. A thread guide 8 is slidably mounted upon a guide bar 9 that extends parallel to the lathe axis and is adapted to be fed back and forth along the guide either manually or by power means, preferably at a uniform rate.

In the illustrative embodiment of Figure 1 the mandrel with the inflation stock thereon is rotated uniformly and the thread guide 8 is fed uniformly, there being a little more or a little less than one complete stroke of the thread guide for each complete revolution of the mandrel. The thread 10 is drawn from the source of supply by the rotation of the mandrel so that no slack occurs in the thread at any point. The inflation stock may be unvulcanized at this stage or in any event may be in such condition that the thread readily adheres to it.

It will be observed that when the reinforcement is fabricated in the manner just described, the threads extend spirally and that the spirals are alternately righthanded and lefthanded so that the threads are crossed, but not interwoven, when the reinforcement is complete. Owing to the fact that the reinforcement is made of a continuous thread, the reinforcement is seamless and has no raw edges, the upper and lower extremities being selvage edges. The thread, however, extends obliquely, which is to be desired, since this admits of freer flexibility than could be had if part of the threads extended circumferentially and part longitudinally of the inflation.

It should be particularly observed that there is a substantially greater thread density at the lower end of the inflation where the inflation is reduced in diameter to merge with the milk tube 11. This result follows automatically from the method of manufacture described because there are the same number of threads in this portion of reduced diameter, but the threads are spread over less surface area. This is a highly desirable result for the reason, as previously stated, that expansion of the diameter of this portion of the teat cup is apt to result in a closing off of the suction port 12 of the rigid metallic shell 13. The greater thread density occurring at this point produces the maximum reinforcement in the region where it is required to prevent the occurrence of any such result.

Since the point of thread delivery is spaced from the teat cup stock somewhat, the guide obviously travels somewhat beyond the upper and lower edges of the reinforcement as applied to the inflation. It will be observed that the threads are thus laid down more circumferentially in the upper and lower marginal portions than in the intermediate portions of the reinforcement with the result that there is a many fold overlapping and that the threads are more closely packed in the upper and lower marginal portions than in the intermediate portion of the reinforcement. It is the purpose of this invention to make use of this greatly increased cordage to resist the collapse of the inflation at both the upper and lower sealed joints between the inflation and the inflation shell and thus prevent leakage at these joints without objectionably thickening the wall of the inflation at these joints.

After the reinforcement has been formed upon the teat cup stock 2, additional rubber may be added or not as desired, and the stock may thereafter be vulcanized to securely and permanently unite the reinforcing threads with the rubber.

It will be appreciated, of course, that the method of operation which consists in rotating the mandrel uniformly and in feeding the thread guide back and forth uniformly, has been described for illustrative purposes, and that variations may be resorted to as desired for securing a different distribution of thread densities, if such a construction should be found advantageous.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. An elastic teat cup inflation and a textile reinforcement therefor having greater thread density adjacent the ends of the inflation than in the portion intermediate the ends.

2. An elastic teat cup inflation and a seamless textile reinforcement therefor in which the threads extend obliquely of the inflation and the upper and lower edges of the reinforcement are selvage edges.

3. An elastic teat cup inflation and a seamless textile reinforcement therefor whose natural shape is the same as that of the inflation, the threads of the reinforcement extending back and forth between the ends thereof and being unbroken at the ends.

4. In a teat cup, in combination, a rigid casing having a port therein adapted to communicate with a source of suction, and an elastic inflation in said casing dividing the casing into inner and outer chambers, said inflation including a textile reinforcement, the reinforcement having greater thread density in the end adjacent the suction port than in the other portions of the inflation.

5. An elastic teat cup inflation comprising a rubber lining and a reinforcement consisting of a plurality of layers of threads, the threads of a layer crossing the threads of an adjacent layer at an angle without being interwoven therewith.

6. An elastic teat cup inflation comprising a rubber lining and a reinforcement consisting of a plurality of layers of threads, the threads of a layer crossing the threads of the adjacent layer at an angle without being interwoven therewith, the threads of each layer extending obliquely to the axis of the inflation at substantially equal but opposite angles.

In testimony whereof I have affixed my signature to this specification.

BESSIE S. HOGELAND.